Jan. 6, 1970 J. A. STAFFORD 3,488,660

METHODS AND APPARATUS FOR RECORDING WELL LOGGING SIGNALS

Filed Dec. 27, 1967 6 Sheets-Sheet 1

John A. Stafford
INVENTOR.

BY Edward M. Roney

ATTORNEY

John A. Stafford
INVENTOR.
BY Edward M. Roney
ATTORNEY

Jan. 6, 1970 J. A. STAFFORD 3,488,660

METHODS AND APPARATUS FOR RECORDING WELL LOGGING SIGNALS

Filed Dec. 27, 1967 6 Sheets-Sheet 3

John A. Stafford
INVENTOR.

BY Edward M. Roney

ATTORNEY

Jan. 6, 1970 J. A. STAFFORD 3,488,660

METHODS AND APPARATUS FOR RECORDING WELL LOGGING SIGNALS

Filed Dec. 27, 1967 6 Sheets-Sheet 4

John A. Stafford
INVENTOR.

BY Edward M. Roney

ATTORNEY

John A. Stafford
INVENTOR.

BY Edward M. Roney
ATTORNEY

METHODS AND APPARATUS FOR RECORDING WELL LOGGING SIGNALS

Filed Dec. 27, 1967 6 Sheets-Sheet 6

John A. Stafford
INVENTOR.

BY Edward M. Roney
ATTORNEY

United States Patent Office 3,488,660
Patented Jan. 6, 1970

3,488,660

METHODS AND APPARATUS FOR RECORDING WELL LOGGING SIGNALS

John A. Stafford, Houston, Tex., assignor to Schlumberger Technology Corporation, New York, N.Y., a corporation of Texas Filed Dec. 27, 1967, Ser. No. 694,009
Int. Cl. G01d 9/28
U.S. Cl. 346—1 18 Claims

ABSTRACT OF THE DISCLOSURE

The particular embodiment described herein as illustrative of the invention describes a recording system for recording well logging signals. Light from a light source is modulated by the well logging signals, the modulated light passing through a rotatable refracting medium and reflecting off of a rotatable reflective means onto a recording medium to make a log of the well logging signals. One of the refracting or reflective means is disabled when the other means is being rotated, the rotatable means causing the modulated light to sweep across the recording medium. Means are provided for synchronizing the frequency of rotation of the rotatable means with the frequency of a recurrent well logging event and the position of the light impinging on a given position of the recording medium with the recurrent well logging event.

This invention relates to the recording of well logging signals which are supplied from a downhole investigating apparatus. The invention is especially useful for the recording of well logging signals derived from well logging apparatus which produces a recurrent event at periodic time intervals.

One type of such well logging apparatus is the so-called "sonic logging" apparatus. In the usual sonic logging method, the recurrent well logging event is an acoustic burst of energy transmitted into the earth formations adjoining a borehole from a suitable transmitting transducer. A nearby receiving transducer then converts the received acoustical waves into electrical signals for transmission to the surface of the earth. The transmitter is usually fired at a constant frequency. Usually, both the received signal and the transmitted firing pulse are recorded. One way of recording such well logging signals is to record a variable density log of these signals by utilizing an oscilloscope and oscilloscope camera combination as shown in U.S. Patent No. 3,302,165 granted to T. O. Anderson et al. on Jan. 31, 1967. Although generally acceptable results are obtained, an oscilloscope and oscilloscope camera combination has been found to be an expensive, complicated, and bulky set of equipment.

One novel and highly desirable manner of recording such well logging signals is shown in a copending application Ser. No. 693,818 by Denis R. Tanguy wherein a glow modulator tube is utilized in conjunction with a rotating mirror to sweep a modulated light beam across a recording medium. The light beam is swept at the frequency of the recurrent energy transmission.

Another logging apparatus that produces such a recurrent event is a so-called "televiewer" apparatus shown in copending application Ser. No. 697,796 by J. E. Chapman. This televiewer apparatus provides for rotating a sensing means, in this case a directional sonic transducer, so as to scan the circumference of a borehole wall while transmitting and receiving acoustic bursts of energy. Thus, in effect, the sensing means makes a spiral through the borehole as the sensing means is moved through the borehole. The transducer signals representing these acoustic bursts of energy are then transmitted to the surface of the earth to be recorded. The recorded signals provide a picture of the borehole wall, and thus the name "televiewer." Azimuth signals are also transmitted to the surface of the earth to provide indications of the recurrent well logging event so that the resulting recorded log can be referenced to the azimuthal directions. One way of recording such well logging signals is to use an oscilloscope, as shown in the Chapman application. However, again, an oscilloscope camera is an expensive and bulky set of equipment and it would therefore be desirable to record such a log with relatively inexpensive and nonbulky recording equipment.

One possible manner of providing such nonbulky and inexpensive recording equipment for recording such "televiewer" signals is to utilize the rotating mirror technique of the above-mentioned copending Tanguy application. However, if the downhole sensing means is continuously rotating (which is highly desirable), it then becomes desirable, if not necessary, to start one sweep across the recording medium immediately after the preceding sweep. Otherwise, information to be recorded during the "dead time" between sweeps will be lost. Since, in the above-mentioned televiewer apparatus, one sweep is made across the recording medium for each scan of the entire circumference of the borehole wall (each 360° rotation), this dead time would, in effect, blank out a given circumferential portion of the recorded log.

Thus, to record such a circumferential log, a recording apparatus should desirably be able to produce a sweep across the recording medium as the rotating sensing means makes one complete revolution around the borehole and then be able to immediately start another sweep across the recording medium as the rotating sensing means starts another rotation around the borehole. When utilizing a rotating mirror, even one with a great many reflective surfaces, it is difficult to reduce this dead time between sweeps across the recording medium to effectively zero. Thus, it would be desirable to be able to provide a relatively simple and inexpensive recording technique which will allow the recording of logs derived from such continuously rotatable sensing means.

When utilizing rotating optical means, such as the above-mentioned rotating mirror, for recording well logging signals, other problems present themselves. One such problem is the synchronization of the frequency of rotation of the optical rotating means with the frequency of occurrence of the above-mentioned well logging event. (e.g., For the televiewer, the sweep frequency across the recording medium should equal the frequency of the generated azimuth signals). Additionally, it would be desirable to provide position synchronization, i.e., the sweeping light will be at the same position on the width of the recording medium each time the well logging event signal is received. By so doing, the presentation on the recording medium will line up properly with the reference grid (e.g., for the televiewer, magnetic north will be at the same position on the recording medium for each sweep).

It would also be desirable to provide relatively simple and inexpensive recording apparatus which will be able to record well logging signals derived from both the continuously rotatable sensing means and other types of investigating apparatus as the standard type of sonic logging apparatus, with the utilization of only one recording apparatus.

It is an object of the invention therefore to provide new and improved methods and apparatus for recording well logging signals.

In accordance with the present invention, methods and apparatus for recording well logging signals derived from investigating apparatus moved through a borehole comprises moving a recording medium as a function of borehole depth and generating a light output. The light output is then modulated with representations of the well logging signals and the modulated light is swept across the recording medium. In accordance with one feature of the invention, a rotatable refracting medium is utilized to sweep the modulated light across the recording medium. By so doing, the "dead time" between sweeps across the recording medium can be reduced to zero. This is especially desirable for recording well logging signals derived from investigating apparatus of the type in which a sensing means is rotated as the investigating apparatus is moved through a borehole to provide well logging signals relative to circumferentially spaced portions of the media surrounding the borehole. In this connection, another feature of the invention provides frequency synchronization between the sweep of the rotating refracting medium and the rotation of the sensing means.

Another feature of the invention provides for adjusting the relative orientation of the means that sweeps the light across the recording medium whereby the light impinging on a given position of the recording medium can be synchronized with a recurrent well logging event.

For a better understanding of the present invention, together with other and further objects thereof, reference is had to the following description taken in connection with the accompanying drawings, the scope of the invention being pointed out in the appended claims.

Referring to the drawings.

Figure 1:
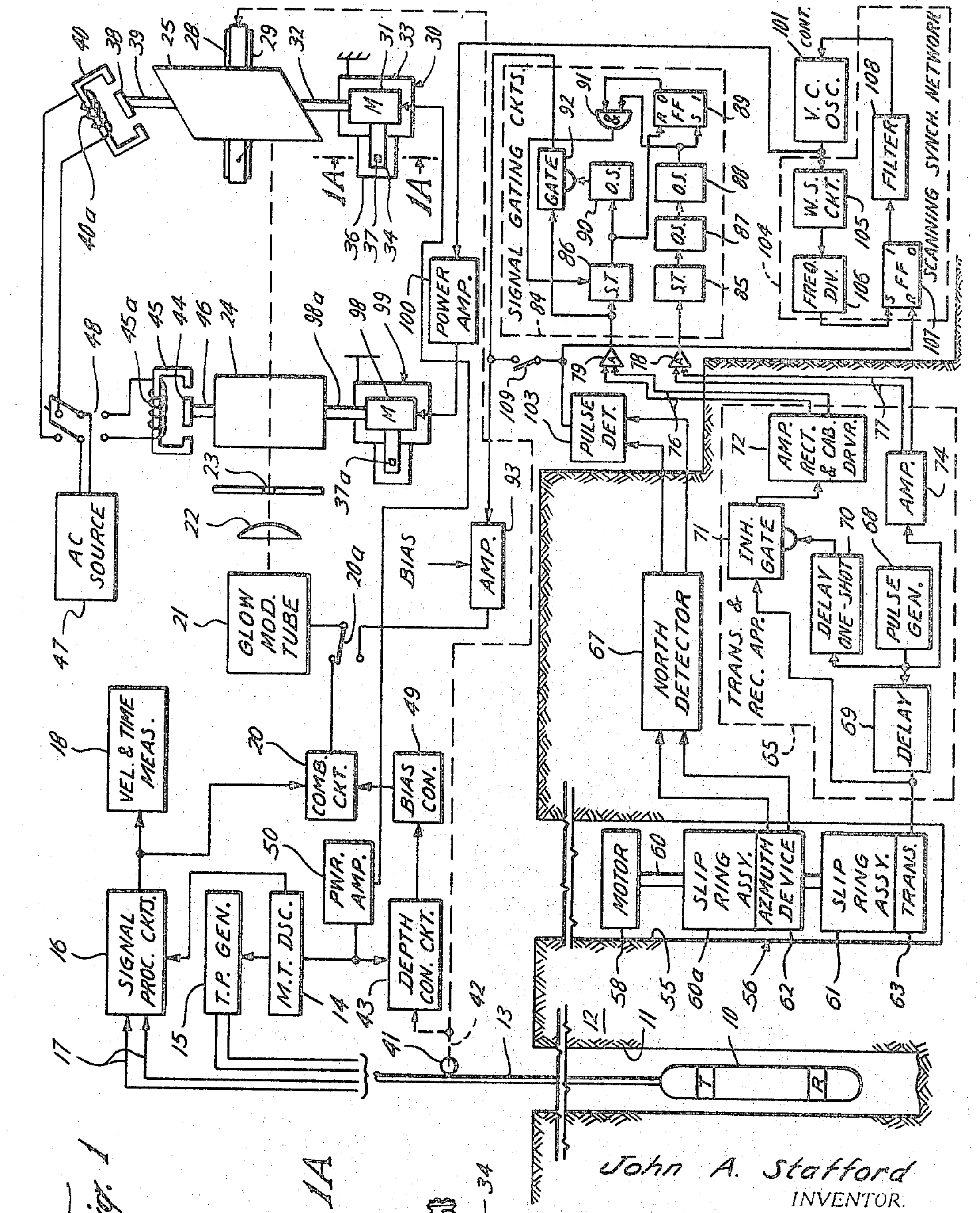
FIGURE 1 shows a plurality of investigating apparatus in a borehole along with apparatus for recording well logging signals derived from the various investigating apparatus in accordance with the present invention.
Figure 4:
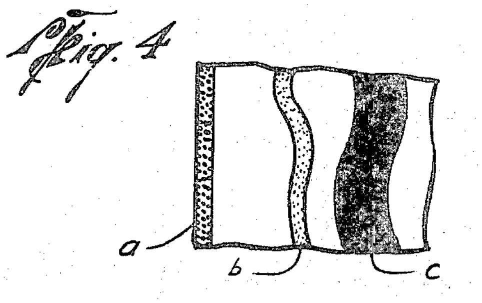
Figure 7:
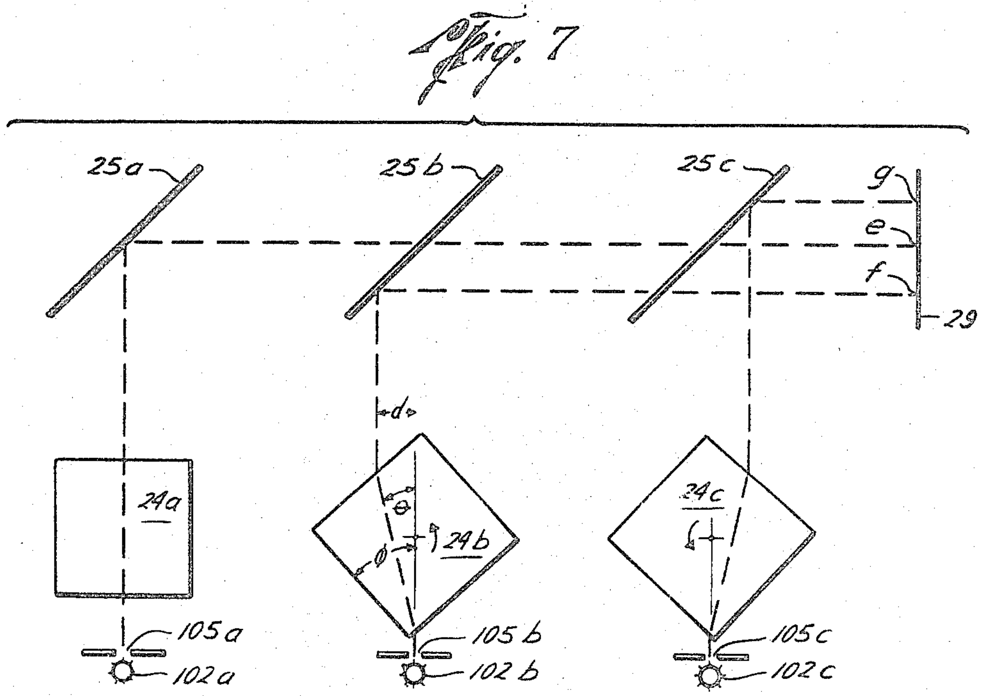
Figure 8A:
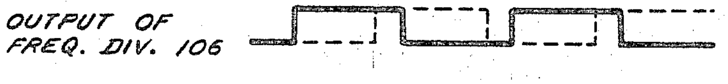
Figure 8B:
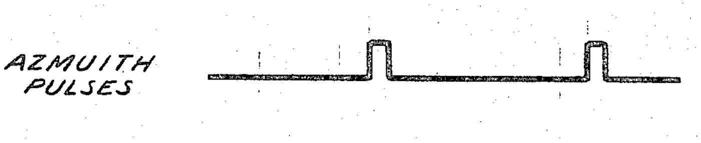
Figure 8C:
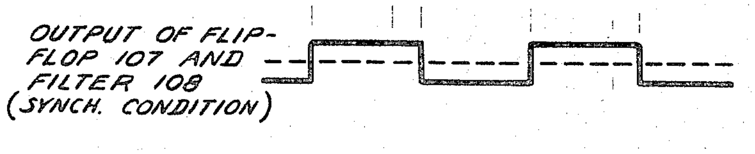
Figure 8D:
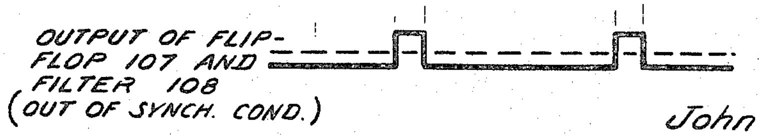
Figure 9:
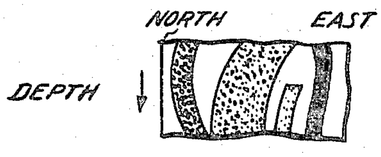

FIGURES 3A–3E graphically represent the operation of various portions of the FIGURE 1 apparatus;

FIGURE 4 represents a typical example of how the recording medium shown in the FIGURE 1 apparatus might look, after developing, when recording signals from one of the investigating apparatus of FIGURE 1;

FIGURES 5A–5F represent graphically voltage wave forms at various points in a downhole portion of the FIGURE 1 apparatus;

FIGURES 6A–6H represent graphically the voltage wave forms at various points in a portion of the FIGURE 1 surface apparatus;

FIGURE 7 represents graphically the operation of a portion of the optical features of the FIGURE 1 apparatus;

FIGURES 8A–8D represent graphically the voltage wave shapes in a certain other portion of the FIGURE 1 apparatus; and FIGURE 9 shows a typical example of how the recording medium of FIGURE 1 might look, after developing, when recording signals derived from another one of the downhole investigating apparatus shown in FIGURE 1.

Now referring to FIGURE 1, there is shown a downhole investigating tool 10 disposed in a borehole 11 for investigating earth formations 12. The tool 10 is supported in the borehole 11 on the end of an armored multiconductor cable 13 which is raised and lowered by a suitable drum and winch mechanism (not shown). The tool 10, in this case, is shown to be a sonic logging tool having a transmitter T for periodically transmitting bursts of acoustic energy and a receiver R displaced a suitable distance from the transmitter T for receiving the acoustic energy. Suitable electronic equipment such as amplifiers may be placed in the down hole tool in the usual manner.

Now referring to the circuitry at the surface of the earth for energizing the tool 10 and receiving the well logging signals therefrom, a master timing oscillator 14 having a substantially constant frequency provides timing signals to a transmitter pulse generator 15 which supplies transmitter firing pulses to the transmitter T within the tool 10 via the cable 13. The received signals from the receiver R and the transmitter firing pulse are supplied to the surface of the earth via the cable 13 to suitable signal processing circuits 16 which act to extract the necessary information in the usual manner and apply it to velocity and travel time measurement circuits 18. The output signal from master timing oscillator 14 can also be supplied to signal processing circuits 16 for timing purposes. If desired, the master timing oscillator 14 and transmitter pulse generator 15 could be placed downhole.

Now concerning a portion of the recording features of FIGURE 1, the output signal from signal processing circuits 16 is also supplied to a combining circuit 20. The output signal from combining circuit 20 is utilized to modulate the light output of a glow modulator tube 21 which could comprise, for example, a Sylvania GM 514 Glow Modulator Tube. This modulation signal is supplied via a double-pole switch 20*a*. The light from the glow modulator tube passes through a collimating lens 22 which collects the light and passes it through a slit 23 which has a relatively narrow width, as shown, but a fairly large height (dimension extending into the paper). The light emanating from the slit 23 passes through a rotatable refracting medium 24, in the form of a four-sided prism, and is reflected off of a rotatable mirror 25 through a lens 26 (obscured by mirror 25) which is disposed relatively close to the mirror 25. The light passing through lens 26 is then passed through a cylindrical lens 28 onto a recording medium 29. This ray of light shown in FIGURE 1 represents, in effect, the light as recording medium 29 would see it, the various lenses acting to focus the light to a point on the recording medium. This optical operation will become apparent when discussing FIGURE 2.

In operation, the image (or light spot) on the recording medium 29 will be swept thereacross as the rotating mirror 25 or rotating refracting medium 24 is rotated. In the example depicted in FIGURE 1, the rotating mirror 25 and refracting medium 24 are utilized separately to record well logging signals derived from different types of downhole investigating apparatus. Although it would be possible to utilize the rotatable refracting medium to record both the well logging signals from signal processing circuits 18 and from the downhole televiewer apparatus (not yet discussed), the sweep frequency (i.e., the frequency at which the light spot is swept across the recording medium) will usually not be the same for both applications. Thus, different motors may be required for each application.

To avoid having to manually change motors or gears, when different sweep frequencies are used, both the rotatable mirror 25 and refracting medium 24 are left in the optical system of FIGURE 1. When the rotatable mirror is utilized as the sweeping means, the rotatable refracting medium is held at a fixed position, and vice versa when the refracting means is utilized as the sweeping means. To hold the rotatable mirror 25 at a fixed angular position, a longitudinally extending magnetic member 38 is fixed transversely to a shaft 39 which is connected to the rotatable mirror 25. A bent magnetic member 40 adapted to be energized by a coil 40*a*, forms a magnetic path with the magnetic member 38 so that when the coil 40*a* is energized, the magnetic member 38 will line up in a specified direction in response to the applied magnetic force. The rotatable refracting medium 24 has a similar arrangement with magnetic members 44 and 45, coil 45*a*, and shaft 46. To selectively energize coils 40*a* and 45*a*, an AC power source 47 is supplied to the common contacts of a double-pole, double-throw switch 48, the switching contacts of which are supplied individually to coils 40*a* and 45*a*.

The rotating mirror 25 is rotated by a motor assembly 30 which includes a motor 31 driving a shaft 32 to rotate the mirror 25. The motor 31 is desirably a synchronous motor and is enclosed in a suitable housing 33. The space between the motor 31 and housing 33 can be filled with ball bearings, oil, or some other similar material to provide easy rotation of the motor 31 with respect to the housing 33. To provide for rotational movement of the motor 31 with respect to the housing 33, a lever arm 34 is attached to the motor 31 and passes through an opening 35 in the motor housing 33. This opening 35 has a width sufficient for the arm 34 to pass through and a sufficient circumferential extent so as to rotate the motor 31 the desired amount. A stop member 36 is fixed to the motor housing 33 and a thumbscrew 37 passes through an opening within the lever arm 34 to rest against the stop member 36.

Figure 1A:
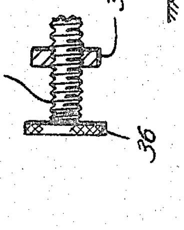
FIGURE 1A shows a cross section view taken along the section lines 1A—1A of a motor assembly shown in FIGURE 1.

This can better be seen in FIGURE 1A which is a cross section view through the screw 37 of FIGURE 1. It can be seen that the relative angular position of the motor 31 with respect to the housing 33 can be varied by turning the thumbscrew 37 so as to move the lever arm 34 with respect to the stop member 36, and thus the motor 31 with respect to the motor assembly 33. The screw 37 can be made of a flexible material so as to be routed to the front panel of the recording apparatus to allow easy adjustment of the relative angular position of motor 31. The rotation of the mirror 25 or refracting medium 24 will act as a spring to keep the thumbscrew 37 against the stop member 36.

The signals modulating glow modulator tube 21, as will be explained later, provide a variable density trace of the well logging measurements on the recording medium 29. However, since the rate at which the tool 10 travels through the borehole cannot always be constant and thus the rate of travel of recording medium 29 cannot always be constant, a depth control circuit 43 is provided. This depth control circuit is responsive to the movement of the cable 13, through the action of a rotating wheel 41 and shaft 42, and the output pulses from master timing oscillator 14 for energizing a bias control circuit 49 at the proper time. The bias circuit 49 supplies a negative voltage to the combining circuit 20 until it is desired to record a well logging signal from signal processing circuits 16. During the time when the trace is being recorded on recording medium 29, bias control circuit 49 supplies a bias voltage of a given desired positive value to the combining circuit 20. This combining circuit could take the form of a switching circuit, like a relay, for example. Thus, a trace of the well logging signals from signal processing circuits 16 at equal depth intervals is provided by this arrangement. A typical arrangement of this depth control circuit can be found in U.S. Patent No. 3,333,237 granted to J. E. Chapman, III on July 25, 1967.

Figure 2:
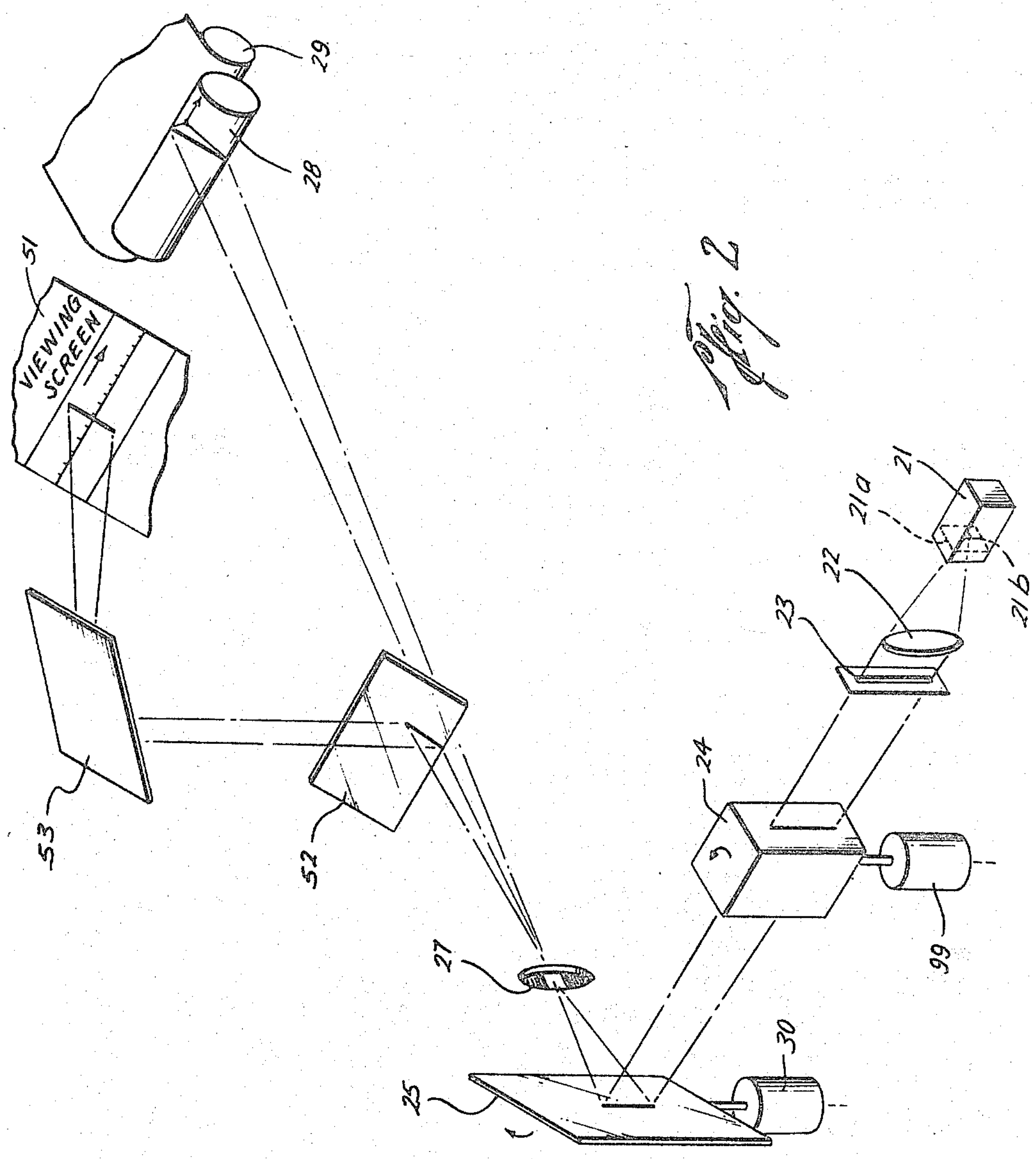
FIGURE 2 is an isometric view of the optical features of the present invention.

Referring now to FIGURE 2, there is shown an isometric view of the optical features of the recording apparatus of FIGURE 1. The glow modulator tube 21 includes an opaque plate 21*a* which has a circular hole or cut-out portion 21*b* therein through which the modulated light passes. The electrode portion of the glow modulator tube 21 is not shown in FIGURE 2. The light passing through the hole 21*b* passes through the lens 22 which acts to gather the light from the glow modulator tube 21 and pass it through the slit 23. The focal length of the lens 22 is selected so as to develop an image of the circular hole 21*b* on a lens 27, which is situated on the recording medium side of the rotating mirror 25. The focal length of the lens 27 is selected so that an image of the slit 23 will appear on the recording medium 29 (forgetting for a moment the cylindrical lens 28), and on a viewing screen 51 after reflecting off of a pair of stationary mirrors 48 and 49. The viewing screen 51 desirably has grid marks (not shown) thereon corresponding with various positions across the width of the recording medium 29 so that the positions of both the viewing screen and recording medium can be correlated.

The geometrical projections from the slit 23 through the refracting medium 24, lens 27 to the recording medium 29 and viewing screen 51 are shown in FIGURE 2 to give a better understanding of how images of the slit 23 are made on both the recording medium 29 and viewing screen 51. By placing a mirror 52 in a position so as to intercept a portion of the light traveling to the recording medium 29, the sweeping light can be divided in two directions. The upward reflected light is reflected off of a mirror 53 onto the viewing screen 51 so as to make an image of the slit 23 thereon. The remainder of the light not intercepted by mirror 52 passes to the cylindrical lens 28 which acts to focus the light to a point image on the recording medium 29. The distance from the lens 27 to both the viewing screen 51 and recording medium 29 should desirably be about the same in accordance with the focal length of lens 27. The lens 27 is desirably masked so as to provide an object of a fixed vertical length for the cylindrical lens 28. (Note that the geometrical projections shown in FIGURE 2 do not represent the entire bundle of light, but only represent geometrical projections to show the images of the slit 23 produced by the lens 27. Actually, light rays are striking every point on the lens 27.) This masking, then will insure that the height of the spot made on the recording medium 29 is constant. The width is controlled by the width of the slit 23 in combination with the focal length of the lens 27 and the distances between the slit 23 and lens 27 and the recording medium 29 and lens 27.

Thus, as the rotatable mirror 25 rotates in a clockwise direction (looking down on the mirror), or the rotatable refracting medium rotates in a counterclockwise direction, the images on the viewing screen 51 and the recording medium 29 will sweep from left to right across the viewing screen and recording medium. If desired, both sides of the rotating mirror 25 could be reflective or a multi-sided reflective means could be used to provide a higher sweep frequency and thus less dead time between sweeps across the recording medium 29. During the time that rotating mirror 25 is acting as the sweeping means, the rotating refracting medium 24 is being held in place by the magnetic means (not shown in FIGURE 2) discussed in FIGURE 1 so as to not deflect the light, i.e., its face is held perpendicular to the light emanating from slit 23. On the other hand when the refracting medium 24 is acting as the sweeping means, the rotatable mirror 25 is likewise held in a fixed position.

It is to be understood that certain other corrective lens and filters could be placed in the optical system of FIGURE 2 in accordance with standard optical techniques, such as for example, a gradient filter to make sure that the image brightness is constant for any angular position of mirror 25 or refracting medium 24 (for any given constant light output of tube 21). Likewise, since the image beam distance between the recording medium 29 and rotating mirror 25 changes slightly as the light spot is swept across the recording medium, a suitable corrective lens could be provided. Also, if desired, mirrors could reflect the light passing to the recording medium 29 to any desired position, in the same manner as the light is reflected to the viewing screen 51, thus allowing the recording medium to be located at any desired position.

Figures 3A, 3B, 3C, 3D, 3E:
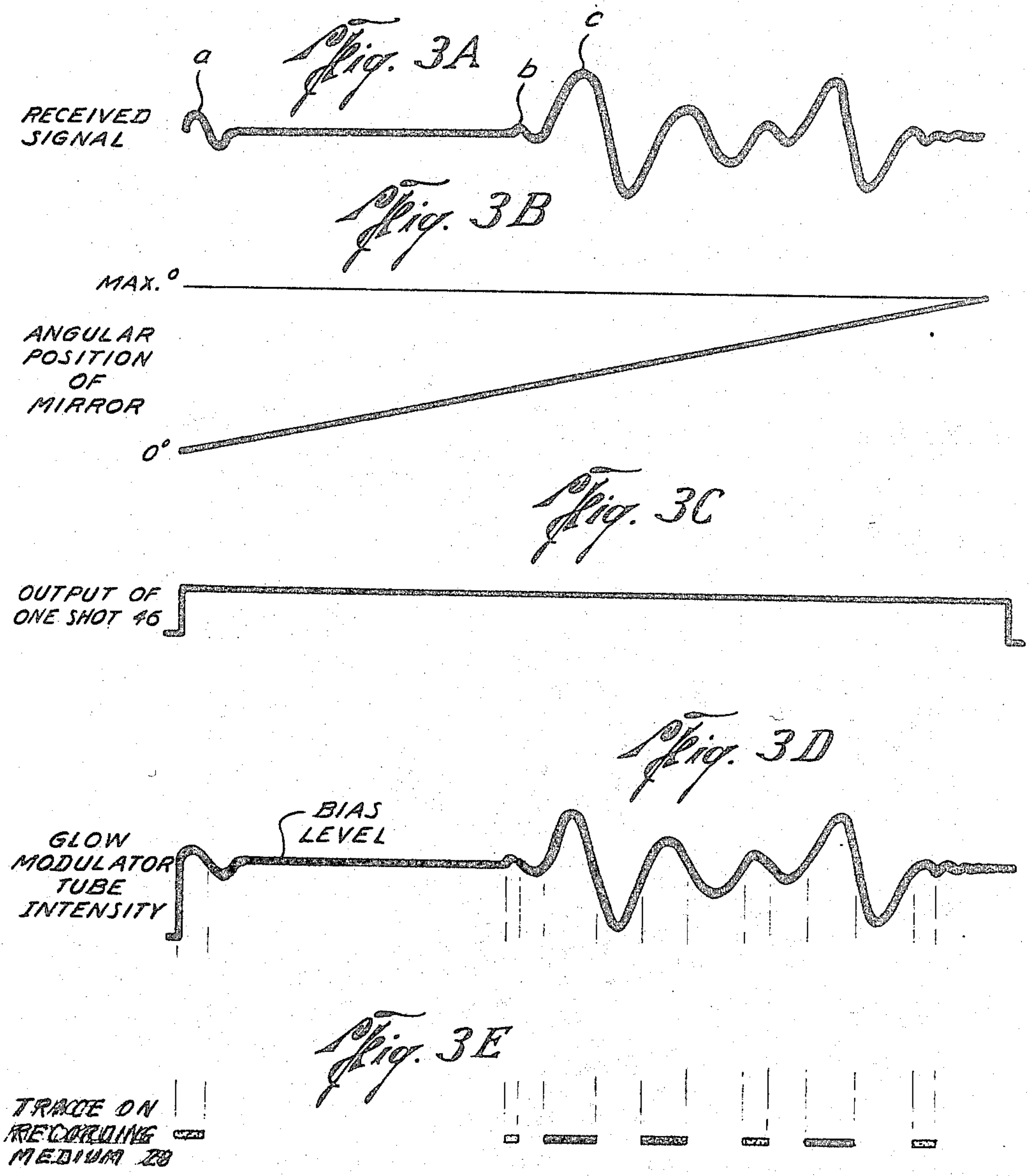

Referring to FIGURES 3A–3E to gain a better understanding of how the well logging signals from signal processing circuits 16 are recorded, FIGURE 3A shows the signals supplied from the signal processing circuits 16. The first portion of this signal (on the left-hand side), designated *a*, is the transmitter firing pulse received at the surface of the earth and the later arriving signal (on the right-hand side) is the signal received at the surface of the earth which was picked up by the receiver R in the tool 10. FIGURE 3B shows a plot of the angular position of the rotating mirror 25 as a function of time. If the mirror 25 is rotating at a substantially constant angular velocity, the time axis can also be considered to represent the width of the recording medium 29. That is to say, as the rotating mirror rotates from 0° to the maximum angular position, the beam of light is swept from one side of the recording medium to the other (or one side of a recording track to the other).

FIGURE 3C shows the output wave form from depth control circuit 43 which causes the bias control circuit 49 to bias the glow modulator tube 21 to the proper bias level to allow modulation thereof by the signal of FIGURE 3A. FIGURE 3D shows the intensity of light emitted by the glow modulator tube 21. It can be seen that the intensity goes from zero to the bias level in coincidence with the energization of bias control circuit 49 (FIGURE 3C). This bias level is selected so that the bias level itself will produce a slightly visible trace, if any, on the recording medium 29, but a modulation voltage, above this bias level will leave a definite visible trace, the greater the modulation voltage the darker the trace.

The signal of FIGURE 3A then modulates the light intensity output of the glow modulator tube with respect to this bias level, as represented in FIGURE 3D. It can be seen that the greater the positive magnitude of the modulation voltage, the greater will be the light intensity output of glow modulator tube 21. Referring to FIGURE 3E, there is shown the resulting trace on the recording medium 29 due to this modulation of glow modulator tube 21. Since the amplitude of the modulation voltage of FIGURE 3A causes the light intensity output of the glow modulator tube 21 to vary, the traces of FIGURE 3E on the recording medium 29 will vary in density as a function of this amplitude variation. This can be seen by comparing FIGURES 3A or 3D with FIGURE 3E.

Now concerning the synchronization of the rotation of the mirror 25 with the signal of FIGURE 3A which is modulating the glow modulator tube 21, the signal from master timing oscillator 14 after amplification by the power amplifier 50 drives the motor 31 at the same frequency as the frequency of master timing oscillator 14, and thus at the same frequency that the transmitter T in the tool 10 is transmitting energy into the adjoining formations. Therefore, there is one sweep of the light across the recording medium for each time that the transmitting T is fired. This, then insures that the rotating mirror 25 will be frequency synchronized with the recurrent well logging event of firing the transmitter T.

There is one other synchronization matter which it would be desirable to account for. This concerns phase or position synchronization of the sweeping light with the recurrent well logging event. In other words, it would be desirable to have the trace produced on the recording medium by the transmitter firing pulse appear at the same position on the width of the recording medium for each sweep.

To accomplish this position synchronization of the trace with the well logging event, the trace is viewed on the viewing screen 51 of FIGURE 2, which has grid marks thereon. If the recurrent transmitter firing trace does not line up properly, the thumbscrew 37 of FIGURE 1 is adjusted, thus rotating the motor 31 with respect to the motor assembly 33, until the trace is in the desired position. This operation, in effect, causes an adjustment of the relative orientation of the sweeping means for sweeping the light spot across the recording medium so as to synchronize the time relationship of the light spot impinging on a desired position of the recording medium with the recurrent well logging event, i.e., the transmitter T firing pulse.

Referring to FIGURE 4, there is shown an example of how the recording medium (or film) might look after developing. The traces on the left-hand side, designated *a*, corresponds to the similarly designated transmitter firing pulse of FIGURE 3A. Likewise, the plurality of traces designated *b* and *c* correspond to the similarly designated portions of the received signal of FIGURE 3A. (It is to be understood that FIGURE 3A represents one trace across the recording medium while FIGURE 4 represents a plurality of traces.) It can be seen then that the density or darkness of the trace corresponds to the amplitude of the respective wave shape.

Now concerning the "televiewer" investigating apparatus, there is shown to the right of the borehole 11 another borehole 55 having a representative borehole televiewer apparatus 56 for scanning the wall of the borehole 55. The televiewer apparatus 56 includes a suitable motor 58 which drives a shaft 60 at a relatively constant angular velocity. This motor 58 could comprise a synchronous AC motor energized by power supplied from the surface of the earth, or could be a suitable DC motor, for example. Mounted on the shaft 60 are slip ring assemblies 60 and 61 which allow an azimuth device 62 and acoustical transducer 63 to be rotated without losing electrical contact with the electronic cartridge portion of the downhole apparatus. This electronic cartridge is, in reality, above the scanning apparatus shown in FIGURE 1 but is shown to the right thereof for purposes of clarity of the electrical schematic.

This downhole electronic circuitry comprises a transmitter and receiver apparatus 65 for energizing the acoustical transducer 63 at a 2 megacycle rate and receiving the resulting acoustical signal resulting therefrom along with apparatus for supplying a transmitter timing pulse and receiver signals to the surface of the earth. The downhole electronics also includes a north azimuthal detector 67 which is connected to the azimuth device 62 and supplies a pulse to the surface of the earth via a conductor pair 66 everytime the scanning apparatus passes magnetic north.

Figures 5A, 5B, 5C, 5D, 5E, 5F:
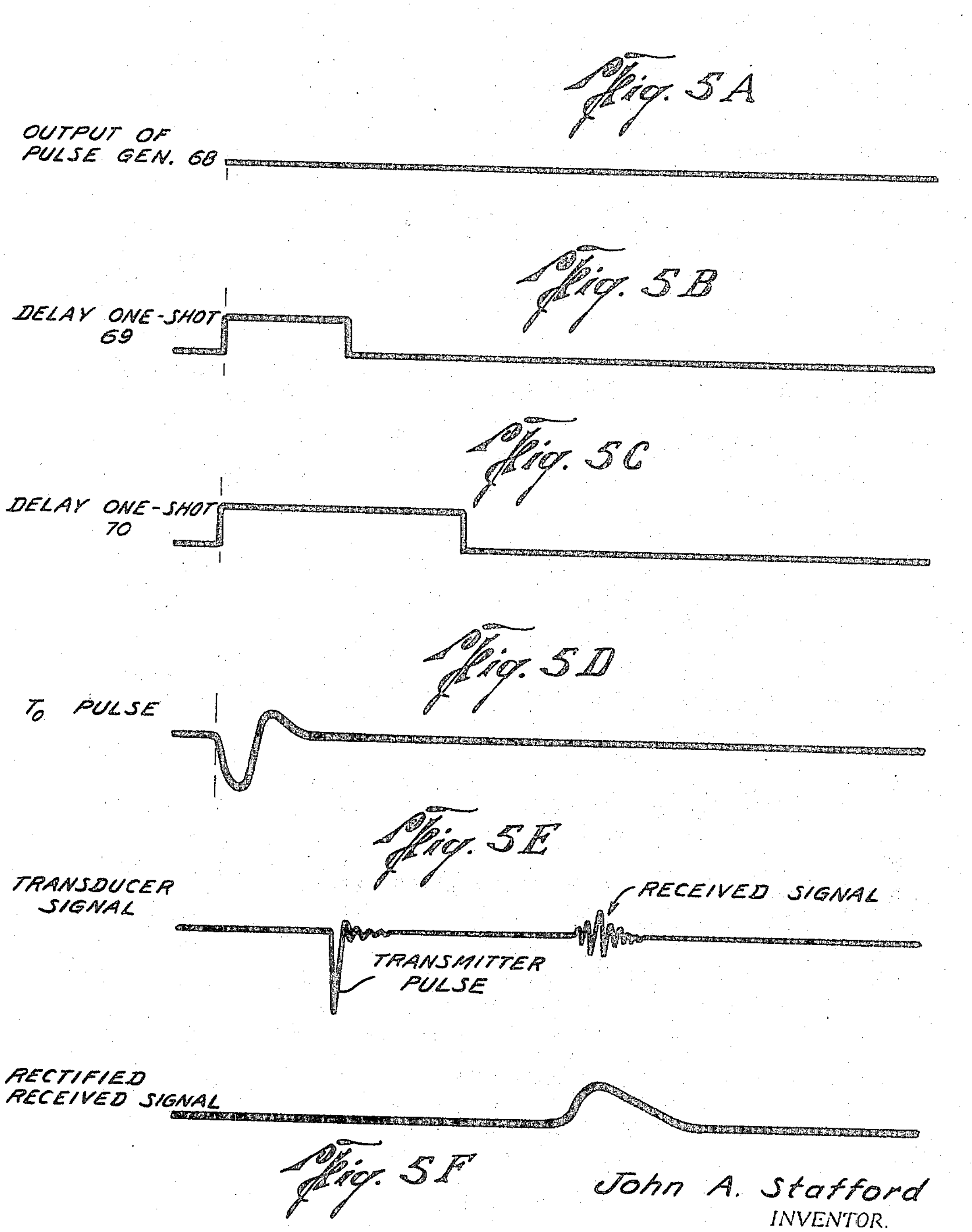

Now concerning the operation of this downhole electronics and first considering the transmitter and receiver apparatus 65, refer to FIGURES 1 and 5A–5F in conjunction. A pulse generator 68 generates the pulses shown in FIGURE 5A (designated transmitter timing pulse $T_0$) at a rate of, for example, 2 kilocycles per second. These pulses are delayed by a delay circuit 69 which could comprise for example a one-shot and another pulse generator responsive to the lagging edge of the one-shot output pulse. The on-time of the delay one-shot 69 is shown in FIGURE 5B and the delayed transmitter firing pulse is shown in FIGURE 5E. The output pulses from pulse generator 68 also energize a delay one-shot 70 whose wave form is shown in FIGURE 5C. The output of delay one-shot 70 energizes an inhibit gate 71 which when unenergized, passes the receiver signals picked up by transducer 63 to an amplifier-rectifier and cable driving circuit 72. The rectifier portion of circuit 72 acts to detect the modulation envelope of the received 2 megacycle burst of acoustic energy. The energization of inhibit gate 71 by delay one-shot 70 insures that the high energy transmitter firing pulses will not reach the amplifier-rectifier and cable driver 72, which is designed to be sensitive to the low energy received signals. The rectified output signal from circuitry 72, shown in FIGURE 5F, is supplied to the surface of the earth via a conductor pair 76. The output pulses from pulse generator 68 are supplied to the surface of the earth via an amplifier and pulse stretcher circuit 74 and conductor pair 77. These pulses, designated transmitter timing pulses $T_0$, are used for timing purposes in the surface electronics since their amplitude can be made sufficiently large to enable relatively reliable detection thereof, while the receiver pulse amplitude is generally not too great.

Now, concerning the circuitry at the surface of the earth for receiving these well logging signals, the transmitter timing pulses $T_0$ and receiver signals on conductor pairs 77 and 76 are amplified by a pair of amplifiers 78 and 79 respectively and applied to signal gating circuits 84. Signal gating circuits 84 act to accurately select the receiver signals for application to the glow modulator tube 21.

Figures 6A, 6B, 6C, 6D, 6E, 6F, 6G, 6H:
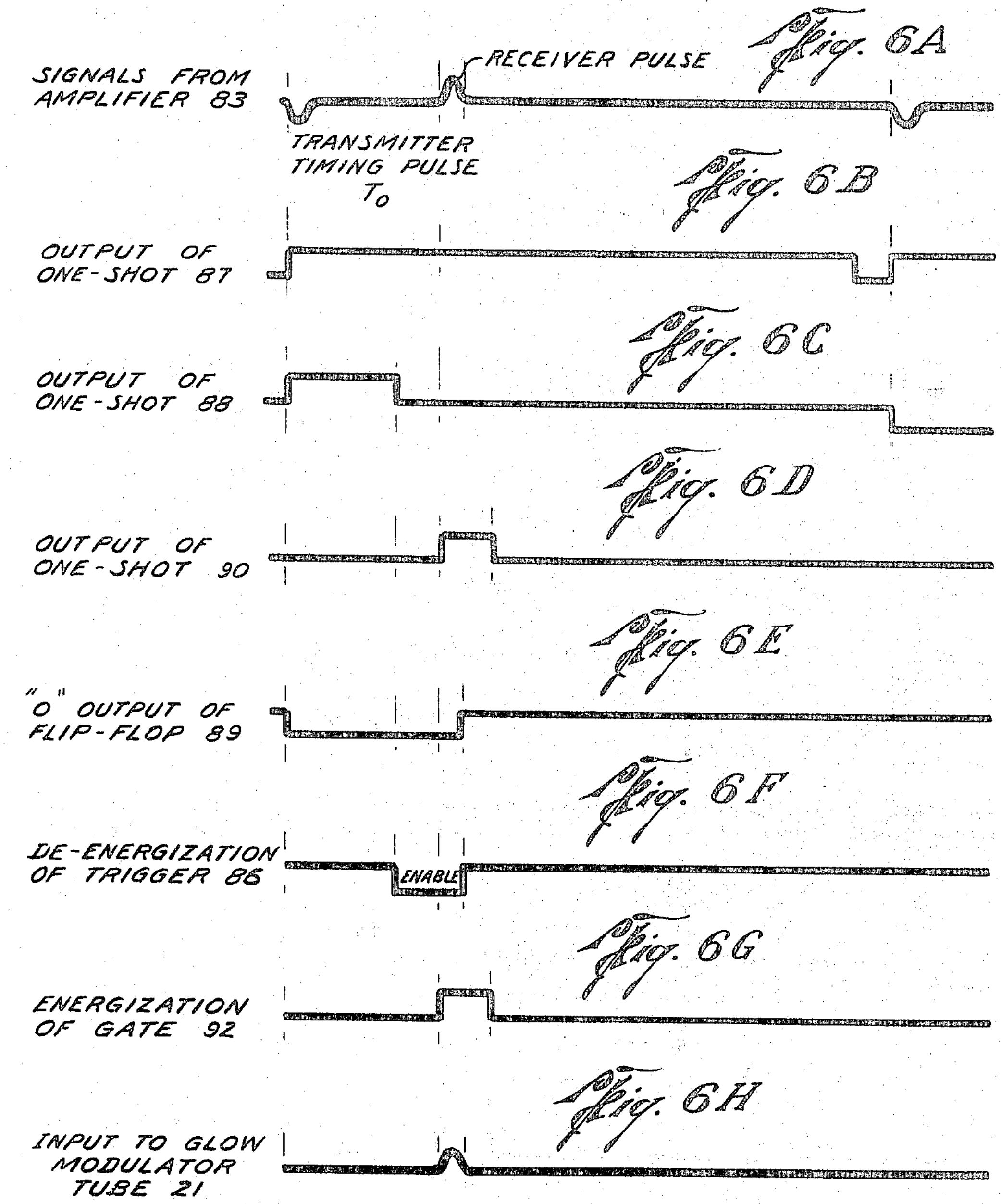

Now referring to FIGURES 6A–6G in conjunction with the signal gating circuits 84 of FIGURE 1, the transmitter timing pulse $T_0$ and receiver signals received at the surface of the earth are separately applied to a pair of Schmitt triggers 85 and 86 respectively. These signals supplied to Schmitt triggers 85 and 86 are shown in FIGURE 6A as positive polarity for the receiver pulse and negative polarity for the transmitter timing pulse $T_0$. The Schmitt triggers 85 and 86 both generate positive pulses when energized. The output pulses from the transmitter pulse responsive Schmitt trigger 85 energize a one-shot 87 whose output wave form is shown in FIGURE 6B. The "on-time" of one-shot 87 is set slightly less than the minimum expected time period between transmitter firings. The leading edge of the output pulse from one-shot 87 energizes a second one-shot 88 whose output wave form is shown in FIGURE 6C. The "on-time" of one-shot 88 is set slightly less than the minimum expected time period between the transmitter timing pulse $T_0$ and the receiver pulse. The leading edge of the output pulse from one-shot 88 energizes the set input of a flip-flop 89 whose output wave form is shown in FIGURE 6E.

Now, when the Schmitt trigger 86 detects a positive receiver pulse, it generates a positive pulse of short time duration which energizes a one-shot 90, whose output wave form is shown in FIGURE 6D. The trailing edge of the detected receiver pulse resets the flip-flop 89, as seen by comparing FIGURES 6A and 6E. It can thus be seen by comparing FIGURES 6A, 6C and 6E, that the output wave form of the "0" output of flip-flop 89 will go to "0" when a transmitter timing pulse $T_0$ is received and will go to "1" on the trailing edge of the detected receiver pulse. The "0" output of flip-flop 89 and the output from one-shot 88 are supplied to the input of an AND gate 91 whose output, when in the "1" or "on" state (shown in FIGURE 6F) acts to de-energize the receiver pulse responsive Schmitt trigger 86. The output of one-shot 90 energizes a gate 92, (shown in FIGURE 6G) thus passing the receiver pulse output from amplifier 83 to an amplifier 93 to which is added the desired constant bias voltage. The output from amplifier 93 is then supplied to the other terminal of the switch 20*a* for modulation of the light output of glow modulator tube 21. This receiver pulse, which is supplied through gate 92 to glow modulator tube 21, is shown in FIGURE 6H.

It can be seen that, by providing the one-shots 87 and 88 in series and making the on-time of one-shot 87 slightly less than the minimum anticipated time interval between transmitter timing pulses $T_0$, the one-shot 88, and thus the flip-flop 89, will only be energized once for each transmitter pulse. Thus, the receiver pulse responsive Schmitt trigger 86 will only be enabled once per transmitter firing. Since the on-time of one-shot 88 is slightly less than the time between the transmitter timing pulse $T_0$ and the correspondig receiver pulse, the Schmitt trigger 86 will be disabled prior to the arrival of the receiver pulse, but will be enabled in time for the receiver pulse since one-shot 88 becomes de-energized before the receiver pulse arrival. Schmitt trigger 86 will then be immediately disabled due to the flip-flop 89 resetting in response to the trailing edge of the detected receiver pulse. As discussed above, the timing of these circuits insures that the correct pulse is supplied to glow modulator tube 21, thus substantially eliminating erroneous detection of noise as receiver pulses.

The foregoing discussion of the televiewer apparatus was to provide an understanding of the nature of this type of well logging signal so that the requirements of the recording system to be used in conjunction therewith can be better understood. A more elaborate form and more detailed explanation of this televiewer apparatus is contained in the above-mentioned copending Chapman application.

Now to record the televiewer signal of FIGURE 6H from signal gating circuits 84, the rotating mirror 25 is held at a designated fixed angular position by placing the double-throw switch 48 in the proper position. Then, to record the televiewer signals, the rotating refracting medium 24 is caused to rotate via a shaft 98*a* by energizing a motor 98, which is desirably a synchronous motor, of a motor assembly 99 constructed in a similar manner to the motor assembly 30 discussed earlier. The motor 98 then causes the rotatable refracting medium 24 to rotate in accordance with the rotation of the downhole televiewer apparatus 56 in response to signals from a power amplifier 100 which is responsive to signals from a voltage controlled oscillator 101 and synchronized with the frequency of the azimuth signals by a scanning synchronization network 104.

Before proceeding with the discussion of how the motor 98 is driven as a function of the rate at which the downhole televiewer apparatus 56 is scanning the wall of the borehole, it would first be desirable to explain how the rotating refracting medium 24 causes the modulated light of glow modulator tube 21 to sweep across the recording medium 29. It should first be emphasized however what is required of a recording system for recording the televiewer signals derived from the downhole televiewer apparatus 56. Since the downhole televiewer apparatus is continuously scanning the wall of the borehole, it would be desirable to provide a continuous record of this derived information. That is to say, it would be desirable to record the information derived from each complete scan around the wall of the borehole, thus requiring no "dead time" between sweeps across the recording medium. One way to accomplish this is to utilize a cathode ray oscilloscope. However, as mentioned earlier, it would be desirable to provide less expensive and less bulky equipment for recording such circumferential type well logging signals as those derived from the televiewer apparatus.

However, by utilizing the rotating refracting medium 24 of the present invention, relatively simple and inexpensive recording equipment can be utilized to record these televiewer signals without having any delay time between sweeps across the recording medium. To better understand this, refer to FIGURE 7 where there is shown the rotating refracting medium 24 at three separate angular positions to explain how the refracting medium 24 causes the light to recurrently sweep across the recording medium. The refracting medium is designated 24*a*, 24*b*, and 24*c* for each of its three angular positions. The rotating mirror 25 is shown in three separate positions, designated 25*a*, 25*b*, and 25*c* to correspond with the three positions of the refracting medium. There are also shown point light sources 102*a*, 102*b*, and 102*c* for demonstration purposes, and a light ray passing from each point light source through slits 105*a*, 105*b*, and 105*c* and refracting mediums 24*a*, 24*b*, and 24*c* to the recording medium 29. (Again, the single ray of light represents the light the way that recording medium 29 sees it.)

First considering the refracting medium 24*a* which shows it in a straight away position, i.e., having one of its faces perpendicular to the light ray emanating from the slit 23*a*, it can be seen that the light ray (dotted line) passes through the prism 24*a* in an unaltered fashion and is reflected off of the mirror 25*a* onto the recording medium 29 at the point *e*.

Now referring to the refracting medium 24*b* which represents the situation where the refracting medium has rotated an angle $\phi$ in a counterclockwise direction. The light ray is then deflected by an angle $\theta$ by the refracting medium and emerges therefrom in a direction parallel to the path the light ray would have taken had the refracting medium not been present, and displaced a distance *d* therefrom. This displaced light ray is then reflected off of the mirror 25*b* and impinges on the recording medium 29 at the point designated *f*.

The displaced distance *d* which the light ray is deflected by the refracting medium is a function of the index of refraction of the refracting medium and the surrounding medium (air in this case) the dimensions of the refracting medium, and the angle of rotation $\phi$. Since $\phi$ is the only variable here, it can be seen that the position of the light spot on the recording medium 29 will be a function of the rotation of the refracting medium.

Now referring to the refracting medium 24*c*, there is shown the rotating refracting medium after it has rotated counterclockwise a slight amount beyond the angular position represented by the refracting medium 24*b*. It can be seen that, in this case, the light ray is deflected in the opposite direction from the direction represented by refracting medium 24*b*. This light ray then is deflected off of the mirror 25 onto the recording medium 29 at the point designated *g*.

Thus, in operation, the rotating refracting medium 24 causes the light ray to sweep across the recording medium 29 in the direction indicated by the arrow and upon reaching the far side of the recording medium at the point *f*, is immediately deflected back to the starting point *g* to begin the sweep again. The light spot will be swept across the recording medium 4 times for each revolution of the rotatable refracting medium. Thus, it can be seen that the rotating refracting medium will cause the beam of light to continuously sweep across the recording medium without any delay between the end of one sweep and the beginning of the next.

Now, referring back to FIGURE 1, it will be explained how the rotation of the rotating refracting medium 24 is synchronized with the rotation of the downhole televiewer apparatus 56. This synchronization is provided by utilizing the azimuth pulses which are generated from the north detector circuit 67 each time the directional sensing means of the downhole investigating apparatus 56 is pointed toward magnetic north. These azimuth pulses are supplied to a suitable pulse detector 103. The pulse detector 103 suitably includes a discriminating amplifier which is responsive to only the azimuth pulses, thus eliminating noise, and a suitable wave-shaping circuit, such as a Schmitt trigger, for squaring up the azimuth pulses received at the surface of the earth. These azimuth pulses are then supplied to the scanning synchronization network 104 for synchronizing the rotatable refracting medium motor 98 with the received azimuth pulses.

The voltage controlled oscillator 101 desirably generates sinusoidal signals which are applied to the motor 98 via the power amplifier 100. There are several considerations in selecting the center frequency of this oscillator 101, namely, the number of poles of the motor 98 as well as any gearing between the motor 98 and the shaft 98*a* which drives the rotating refracting medium 24. Also, it is to be remembered that the rotating refracting medium 24 makes one-quarter of a revolution for each sweep across the recording medium 29, which must be taken into account in determining the center frequency of oscillator 101. Of course, if the refracting medium 24 were other than a four-sided prism, the center frequency of oscillator 101 would change correspondingly. At any rate, the frequency of oscillator 101 may well be somewhat higher than the frequency of the azimuth pulses.

To control the frequency and phase of oscillator 101 in accordance with the azimuth signals, the output signal from oscillator 101 is supplied to a suitable wave-shaping circuit 105, such as a Schmitt trigger to square up these signals. The output signal from wave-shaping circuit 105 is scaled-down in frequency by a frequency divider 106 to a frequency approximating the azimuth signal frequency and the resulting output signal supplied to the set input of a flip-flop 107. Flip-flop 107 is responsive to the positive going edges of the signals applied thereto. The azimuth pulses from pulse detector 103 are supplied to the reset input of flip-flop 107. Thus, the "on-time" of the output signal from flip-flop 107 is representative of the time relationship of the frequency scaled-down signals from frequency divider 106 and the azimuth signals. The "1" output from flip-flop 107 is supplied to a suitable filter 108 which acts to convert this time relationship to a DC control signal proportional to the frequency and phase difference between the azimuth pulses and the scaled-down signal. This DC control signal then acts to vary the frequency and phase of the voltage controlled oscillator 101 so as to bring this scaled-down output frequency into phase and frequency synchronization with the azimuth pulses. This control of oscillator 101 could take the form of, for example, varying the reactance of a varicap in the timing circuit of the oscillator 101.

Referring now to FIGURES 8A–8D, there is shown a plot of the wave forms at various points in the scanning synchronization network 104 for purposes of better explaining the operation of this network. FIGURE 8A shows the scaled-down output of frequency divider 106 and FIGURE 8B shows the azimuth pulses which are applied to the reset input of flip-flop 107. FIGURE 8C shows the output wave form (solid line) of the flip-flop 107 in response to the signals of FIGURES 8A and 8B. Remembering that flip-flop 107 is responsive to the positive going edges of the pulses applied thereto, it can be seen in FIGURE 8C that the flip-flop 107 is turned on in response to the leading edge of the scaled-down pulses of FIGURE 8A and is turned off in response to the leading edge of the azimuth pulses of FIGURE 8B. The filtered output signal from filter 108 resulting from this output signal from flip-flop 107 is the dotted line signal in FIGURE 8C and is used to control the frequency of oscillator 101. This condition represented in FIGURE 8C is the synchronization condition.

Now consider what happens when the phase of the scaled-down oscillator signal becomes out-of-synchronization with the azimuth pulses, as represented in FIGURE 8A by the dotted line wave form. Referring to FIGURE 8D, there is shown the output wave form from flip-flop 107 and the resulting DC control signal applied to oscillator 101 in response to this out-of-synchronization condition. It can be seen that the resulting wave form from flip-flop 107 has a substantially reduced on-time which also substantially reduces the amplitude of the DC control signal. This lower DC control signal then changes the phase of the oscillator frequency to more nearly correspond with the azimuth pulses. The same principle applies if the scaled-down oscillator frequency and the frequency of the azimuth pulses become out of synchronization. Thus, assume the frequency of the azimuth pulses decreases, thus causing the azimuth pulses to become further and further separated from the leading edge of the scaled-down oscillator pulses of FIGURE 8A. In this event, the on-time of flip-flop 107 will begin increasing, thus increasing the DC control signal to oscillator 101. This then will increase the capacitance of the varicap (if a varicap is used) in the oscillator timing circuit, thus decreasing the oscillator output frequency until the frequency of the azimuth pulses and the scaled-down oscillator frequency are substantially equal. The same thing will happen in reverse if the frequency of the azimuth pulses increases with respect to the scaled-down oscillator frequency.

Thus, it can be seen that the rotation of the refracting medium 24 will be synchronized in frequency with the rotation of the donwhole investigating apparatus 56 so that the beam of light from glow modulator tube 21 will be swept across the recording medium 29 in frequency synchronism with the scanning of the borehole wall.

To provide for position synchronization of the sweeping light with respect to the recurrent well logging event, i.e., the azimuth pulses, a switch 109 is provided to apply the azimuth pulses to the glow modulator tube 21 to provide a reference mark on the viewing screen 51. To line up the sweep position with the azimuthal direction, the relative orientation of the sweeping means is adjusted by turning the thumbscrew 37*a* of the motor assembly 99 until the azimuth mark on the viewing screen lines up at the proper position. If desired, the signal gating circuits could be disabled to prevent these signals from appearing on the viewing screen during this orientation operation. Switch 109 could also be periodically closed from time to time during the logging operation to insure that position synchronization continues.

Referring to FIGURE 9, there is shown a typical example of how a portion of the recording medium 29 might look, after developing, when recording these televiewer signals. Since the transmitter T is fired a great many times per scan or revolution around the borehole (perhaps several thousand times), the interval between spots on the recording medium will be substantially undiscernible provided the voltage level of the receiver pulses is high enough. The greater in magnitude these receiver pulses, the denser will be the recording and vice versa. The length of the recording medium is referenced to depth and the width is referenced to azimuthal directions, i.e., north, east, etc. Thus, it can be seen that a continuous log of the circumferential investigation of the borehole is provided.

It can therefore be seen that with the apparatus of the present invention, a relatively simple and inexpensive means has been provided for recording measurements obtained from a borehole scanning type of investigating apparatus such as the televiewer apparatus disclosed. This recording operation is accomplished without any blank spaces on the recording medium due to dead time between sweeps across the recording medium by utilizing the rotatable refracting medium 24. This recording operation can accurately be carried out in synchronism with the scanning of the borehall wall through the action of the scanning synchronization network 104 maintaining frequency synchronization. Position snychronization is maintained by using the viewing screen in combination with the adjustment of the relative orientation of the sweeping means. All of the above can be accomplished with recording apparatus which is adapted to record other types of well logging measurements which do not require the same recording sweep rate as does the televiewer signals, i.e., the "sonic logging" signals by using the refracting medium in combination with the mirror, as discussed.

It is to be understood that downhole investigating apparatus other than that shown in FIGURE 1 could be utilized with the recording features of the present invention. For example, the rotating "induction logging" apparatus shown in U.S. Patent No. 3,187,252 granted to E. T. Hüngerford on June 1, 1965 could be utilized in place of the televiewer apparatus as a circumferential scanning type of investigating apparatus.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of recording well logging signals derived from an investigating apparatus of the type in which a sensing means is rotated as the tool is moved through a borehole and an azimuth signal is generated each time the sensing means has a given azimuthal direction, comprising:

(a) moving a recording medium as a function of borehole depth;
(b) generating an azimuth signal each time the rotating sensing means has a given azimuthal direction;
(c) generating a light output;
(d) modulating the light output with representations of the well logging signals;
(e) sweeping the modulated light across the recording medium; and
(f) synchronizing the frequency at which the modulated light is swept across the recording medium with the frequency of the azimuth signals.

2. A method of recording well logging signals derived from an investigating apparatus moved through a borehole, comprising:

(a) moving a recording medium as a function of borehole depth;
(b) generating a light output;
(c) modulating the light output with representations of the well logging signals;
(d) periodically sweeping the modulated light across the recording medium; and
(e) adjusting the time relationship of the modulated light impinging on a given position of the recording medium with respect to a recurrent well logging event so that the light impinging on said given position will coincide with the recurrent well logging event.

3. A method of recording well logging signals of the type wherein energy is periodically transmitted into earth formations and picked up by sensing means for transmission to the surface of the earth, comprising:

(a) moving a recording medium as a function of borehole depth;
(b) generating a light output;
(c) modulating the light output with representations of the well logging signals;
(d) periodically mechanically sweeping the modulated light across the recording medium at a frequency representative of the frequency at which energy is transmitted into the earth formations;
(e) passing a portion of the sweeping modulated light to a viewing screen; and
(f) adjusting the time relationship of the modulated light impinging on a given position of the viewing screen with respect to the periodic transmission of energy into the adjoining earth formation so that the light impinging on said given position will coincide with the periodic transmission of energy into the formations.

4. A method of recording well logging signals derived from investigating apparatus of the type in which a sensing means is rotated as the tool is moved through a borehole and an azimuth signal is generated each time the sensing means has a given azimuthal direction, comprising:

(a) moving a recording medium as a function of borehole depth;
(b) generating an azimuth signal each time the rotating sensing means has a given azimuthal direction;
(c) generating a light output;
(d) modulating the light output with representations of the well logging signals;
(e) sweeping the modulated light across the recording medium;
(f) passing a portion of the sweeping modulated light to a viewing screen; and
(g) adjusting the time relationship of the modulated light impinging on a given position of the viewing screen with respect to the azimuth signals indicating a given azimuthal direction of the downhole sensing means so that the time at which light impinges on said given position will coincide with the time at which the azimuth signals are received at the surface of the earth.

5. A method of recording well logging signals derived from an investigating apparatus of the type in which a sensing means is rotated as the investigating apparatus is moved through a borehole and an orientation signal is generated each time the sensing means has a given angular orientation, comprising:

(a) moving a recording medium as a function of the movement of said investigating apparatus;
(b) generating an orientation signal each time the sensing means has a given angular orientation;

(c) producing a light output with modulated representations of the well logging signals;

(d) sweeping the modulated light across the recording medium; and (e) controlling the rate at which the modulated light is swept across the recording medium to maintain the sweep rate functionally related to the frequency of the orientation signals.

6. A method of recording well logging signals derived from an investigating apparatus of the type in which a sensing means is rotated as the investigating apparatus is moved through a borehole and an azimuth signal is generated each time the sensing means has a given azimuthal direction, comprising:

(a) moving a recording medium as a function of borehole depth;

(b) generating an azimuthal signal each time the sensing means has a given azimuthal direction;

(c) generating a light output;

(d) producing a light output with modulated representations of the well logging signals;

(e) sweeping the modulated light across the recording medium and generating a rate signal representative of the rate of the sweeping light; and (f) comparing the rate signal with the orientation signals and maintaining the rate at which the modulated light is swept across the recording medium functionally related to the frequency of the orientation signals.

7. Apparatus for recording well logging signals derived from an investigating apparatus of the type in which a sensing means is rotated as the tool is moved through a borehole to provide well logging signals relative to circumferentially spaced portions of the media forming the borehole as the investigating apparatus is moved longitudinally of the borehole, comprising:

(a) a recording medium adapted to be moved as a function of borehole depth;

(b) a light source adapted to be modulated;

(c) means for modulating the light output of the light source with representations of the well logging signals; and (d) means for sweeping the modulated light across the width of the recording medium, said means including a refracting medium disposed optically between the recording medium and the light source and adapted to be rotated so that light from the light source will be swept across the recording medium as the refracting medium is rotated as a function of the downhole sensing means speed of rotation.

8. Apparatus for recording well logging signals derived from an investigating apparatus of the type in which a sensing means is rotated as the tool is moved through a borehole and an azimuth signal is generated each time the sensing means has a given azimuthal direction, comprising:

(a) a recording medium adapted to be moved as a function of borehole depth;

(b) a light source adapted to be modulated;

(c) means for modulating the light output of the light source with representations of the well logging signals; and (d) means for sweeping the modulated light across the width of the recording medium, said sweeping means including:

(1) a refracting medium disposed optically between the recording medium and light source and adapted to be rotated so that light from the light source will be swept across the recording medium as the refracting medium is rotated; and (2) means responsive to the azimuth signals for rotating the refracting medium as a function of the rotation of the downhole sensing means so that the modulated light sweeping across the recording medium will correspond with the rotation of the downhole sensing means.

9. The apparatus of claim 8 wherein the means for rotating the refracting medium includes:

(1) a motor adapted for rotating the refracting medium;

(2) power supplying means for energizing the motor; and (3) means responsive to the power supplied to the motor and the azimuth signals for adjusting a parameter of the supplied power so that the rotation of the refracting medium will be substantially synchronized with the rotation of the downhole sensing means.

10. The apparatus of claim 8 wherein the means for rotating the refracting medium includes:

(1) a synchronous motor adapted for rotating the refracting medium;

(2) alternating current power generating means for energizing the motor;

(3) means for scaling the frequency of the AC power to a frequency approximating the frequency of the azimuth signals; and (4) means for comparing the scaled AC power frequency and phase with the frequency and phase of the azimuth signals and adjusting the frequency and phase of the AC power source in response to the compared signals so that the frequency and phase of the AC power will be synchronized with the frequency and phase of the azimuth signals.

11. Apparatus for recording well logging signals derived from investigating apparatus moved through a borehole, comprising:

(a) a recording medium adapted to be moved as a function of borehole depth;

(b) light means operable in response to well logging signals for providing a modulated light output representative of such well logging signals;

(c) a reflecting means disposed optically between the recording medium and the light source and adapted to be rotated so that light from the light source will be swept across the recording medium when the reflecting means is rotated;

(d) a refracting medium disposed optically between the recording medium and the light means and adapted to be rotated so that light from the light means can be swept across the recording medium; and (e) means for disabling a selected one of said reflecting means or refracting medium while maintaining said disabled means in an optically functional relationship between the recording medium and light source while rotating the other unselected one of said reflective or refractive means to permit the modulated light from the rotating means to be swept across the recording medium.

12. Apparatus for recording well logging signals derived from investigating apparatus moved through a borehole, comprising:

(a) a recording medium for providing a recording as a function of borehole depth;

(b) light means operable in response to well logging signals for providing a modulated light output representative of such well logging signals;

(c) mechanical sweeping means for periodically sweeping the modulated light across the recording medium; and (d) means for adjusting the relative orientation of said mechanical sweeping means whereby the light impinging on a given position of the recording medium can be synchronized with a recurrent well logging event.

13. The apparatus of claim 8 wherein the mechanical sweeping means includes:
(1) a reflecting or refracting means disposed optically between the light source and recording medium and adapted to be rotated so as to sweep the light across the recording medium; and
(2) prime mover means for rotating the reflecting or refracting means; and wherein the means for adjusting the relative orientation of the sweeping means includes means for rotating the prime mover means to provide said synchronization.

14. Apparatus for recording well logging signals of the type wherein energy is periodically transmitted into earth formations and picked up by a sensing means for transmission to the surface of the earth, comprising:
(a) a recording medium arranged to provide a recording as a function of borehole depth;
(b) a light source adapted to be modulated;
(c) means for modulating the light output of the light source with representations of the well logging signals;
(d) mechanical sweeping means for periodically sweeping the modulated light across the recording medium at a frequency representative of the frequency at which energy is periodically transmitted into the earth formations;
(e) a viewing screen;
(f) means for intercepting a portion of the light being swept across the recording medium and passing said intercepted light to the viewing screen so that light will be swept across the viewing screen in unison with the light being swept across the recording medium; and
(g) means for adjusting the relative orientation of the sweeping means whereby the light impinging on a given position of the viewing screeen can be synchronized with a recurrent indication received at the surface of the earth each time that energy is transmitted into the earth formations.

15. Apparatus for recording well logging signals derived from an investigating apparatus of the type in which a sensing means is rotated as the tool is moved through a borehole and an azimuth signal is generated each time the sensing means has a given azimuthal direction, comprising:
(a) a recording medium adapted to be moved as a function of borehole depth;
(b) a light source adapted to be modulated;
(c) means for modulating the light output of the light source with representations of the well logging signals;
(d) sweeping means for periodically sweeping the modulated light across the recording medium;
(e) a viewing screen;
(f) means for intercepting a portion of the light being swept across the recording medium and passing said intercepted light to the viewing screen so that light will be swept across the viewing screen in unison with the light swept across the recording medium; and
(g) means for adjusting the relative orientation of the sweeping means whereby the light impinging on a given position of the viewing screen can be synchronized with the azimuth signal.

16. Apparatus for recording well logging signals derived from an investigating apparatus of the type in which a sensing means is rotated as the tool is moved through a borehole to provide well logging signals relative to circumferentially spaced portions of the media forming the borehole as the investigating apparatus is moved longitudinally of the borehole, comprising:

a recording medium for producing a recording as a function of borehole depth;
a light source operable in response to well logging signals for providing a modulated light output representative of such well logging signals;
means for sweeping the modulated light across the width of the recording medium, said means including a refracting medium optically disposed between the recording medium and the light source and arranged for rotation to provide the sweep of the modulated light; and
means correlated to the rotation of the sensing means of the tool for rotating the refracting medium as a function of the downhole sensing means rotation.

17. Apparatus for recording well logging signals derived from an investigating apparatus of the type in which a sensing means is rotated as the investigating apparatus is moved through a borehole to provide well logging signals relative to circumferentially spaced portions of the media forming the borehole as the investigating apparatus is moved longitudinally of the borehole and an orientation signal is generated each time the sensing means has a give angular orientation, comprising:
(a) a recording medium adapted to be moved as a function of borehole depth;
(b) a light source adapted to be modulated with represenations of the well logging signals; and
(c) means adapted for sweeping the modulated light across the width of the recording medium; and
(d) means responsive to the orientation signals for controlling the rate at which the modulated light is swept across the recording medium so that the sweep rate will be functionally related to the frequency of the orientation signals.

18. Apparatus for recording well logging signals derived from an investigating apparatus of the type in which a sensing means is rotated as the tool is moved through a borehole to provide well logging signals relative to circumferentially spaced portions of the media forming the borehole as the investigating apparatus is moved longitudinally of the borehole, comprising:
(a) a recording medium adapted to be moved as a function of borehole depth;
(b) a light source adapted to be modulated with representations of the well logging signals;
(c) means adapted for sweeping the modulated light across the width of the recording medium and generating a rate signal representative of the rate of said sweeping light; and
(d) means for comparing the rate signal with the orientation signals and controlling the rate at which light is swept across the recording medium to maintain the sweep rate functionally related to the frequency of the orientation signals.

References Cited

UNITED STATES PATENTS

| | | | |
|---|---|---|---|
| Re. 25,928 | 12/1965 | Geyer et al. | 340—18 |
| 2,190,141 | 2/1940 | Walker | 181—0.5 |
| 2,654,064 | 9/1953 | Broding | 346—108 X |
| 2,898,176 | 8/1959 | McNaney | 346—110 |
| 3,302,165 | 1/1967 | Anderson et al. | 340—18 |

JOSEPH W. HARTARY, Primary Examiner

U.S. Cl. X.R.

340—15.5; 346—33, 108